(No Model.)
H. C. PRICE.
PHOTOGRAPHIC CAMERA.
No. 368,732.  Patented Aug. 23, 1887.
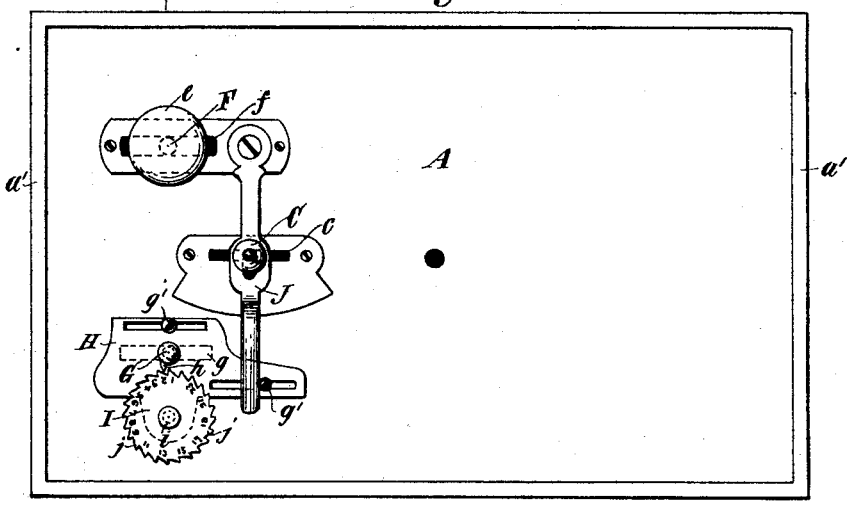
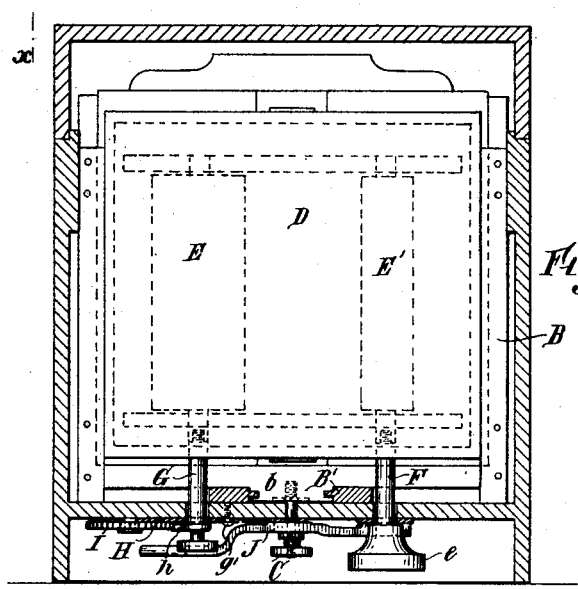
Witnesses  
Jas. R. Bowen  
James D. Griswald
Inventor  
Henry C. Price  
by his attorneys  
Gifford & Brown

UNITED STATES PATENT OFFICE.

HENRY CLAY PRICE, OF NEW YORK, N. Y., ASSIGNOR TO THE SCOVILL MANUFACTURING COMPANY, OF SAME PLACE.

PHOTOGRAPHIC CAMERA.

SPECIFICATION forming part of Letters Patent No. 368,732, dated August 23, 1887.

Application filed July 29, 1886. Serial No. 209,413. (No model.)

*To all whom it may concern:*

Be it known that I, HENRY CLAY PRICE, of New York, in the county and State of New York, have invented a certain new and useful Improvement in Photographic Cameras, of which the following is a specification.

My improvement relates to the class of photographic cameras termed "detective cameras."

I will describe in detail a photographic camera embodying my improvement, and then point out the novel features in a claim.

In the accompanying drawings, Figure 1 is a transverse section of a camera and a box or case containing the same, taken on the plane of the dotted line x x, Fig. 2. Fig. 2 is a bottom plan view of the same.

Similar letters of reference designate corresponding parts in both figures.

I have only illustrated such parts of a camera as are necessary to an understanding of my improvement.

A designates a box or case in which the camera is contained. It is provided with a cover, a, and with a rim or flange, a', about its lower edge, upon which the box may rest and by which the body of the box is raised above the support for the box, and a considerable space is formed between the bottom of the box and such support.

B designates the movable back of a camera. It may be moved to and fro in the box or case, and is partially guided in its movements, as shown, by a tongue-piece, b, which fits in a slot in a portion, B', of the camera-frame. The tongue-piece b is provided with a downwardly-extending screw, C, which passes through a longitudinal slot, c, in the box or case to the outside of the latter. The screw C projects through a slot in a lever, J, arranged transversely to the box or case and pivoted or fulcrumed to the bottom. A nut applied to the end of the screw provides for clamping the lever in position to secure the camera-back when adjusted. The lever, when released from the nut, serves for adjusting the camera-back.

D designates a holder for sensitized paper. The paper is attached to rollers E E'. It is first wound mainly on the roller E, and as it is used it is wound from the latter onto the roller E'.

A screw, F, is passed through a longitudinal slot, f, in the bottom of the box or case and fastened to one of the journals of the roller E'. It in effect forms part of the journal in which it is secured. A hand-piece, e, may be manipulated to rotate the roller E' for the purpose of winding the sensitized paper on it.

A screw, G, is passed through a longitudinal slot, g, in the bottom of the box or case and fastened to one of the journals of the roller E. It in effect forms part of such journal and will rotate with the roller when the latter is rotated. This screw extends also through a plate, H, outside the bottom of the box or case. When the camera-back is adjusted by means of the lever J, the plate H will be moved lengthwise of the box or case by means of the screw G. The plate is guided in its longitudinal movements by means of screws g', extending through longitudinal slots in the plate and into the bottom of the box or case. Outside the plate H a projection, h, (here shown as a toe,) is secured upon the screw G, and will rotate with said screw.

I designates an indicator, which in the example of my improvement shown is in the form of a wheel. This indicator is mounted friction-tight upon a stud, i, upon the plate H. On the periphery of this wheel are a series of teeth, j. When the roller E is rotated, the projection h will be brought into contact with one of the teeth j and rotate the indicator I a distance equal to the distance between two of said teeth. Opposite said teeth, upon the face of the indicator, are arranged figures shown as numbering from 1 to 23, but which may of course be of any desired number corresponding to the number of teeth on the indicator. The figure which is uppermost when the camera is in use indicates the number of exposures which have been made of the sensitized paper.

It will be seen that by my improvement it may readily be ascertained without opening the box or case how many exposures have been made, and consequently to what extent the sensitized paper has been exhausted, as it is customary to place enough of the latter upon the rollers for a given number of exposures only.

What I claim as my invention, and desire to secure by Letters Patent, is—

The combination, with a camera, of a box or case for containing the same, rollers for sensitized paper, journals upon said rollers extending to the outside of said box or case, a movable plate through which one of said journals extends, a hand-piece on the other of said journals for causing the rotation of both said rollers, a projection on the journal of the roller first named, and a toothed indicator arranged in the path of and adapted to be directly engaged with said projection and rotated a distance equal to the distance between two of its teeth at each rotation of the said rollers, substantially as specified.

H. CLAY PRICE.

Witnesses:
D. H. DRISCOLL,
JAS. R. BOWEN.